(12) United States Patent
Chang et al.

(10) Patent No.: US 9,131,198 B2
(45) Date of Patent: Sep. 8, 2015

(54) SIGNAL PROCESSING APPARATUS AND ASSOCIATED METHOD

(71) Applicant: MStar Semiconductor, Inc., Hsinchu Hsien (TW)

(72) Inventors: Chu-Hsin Chang, Zhubei (TW); Kai-Wen Cheng, Zhubei (TW); Yi-Ying Liao, Taipei (TW); Tung-Sheng Lin, Taoyuan (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 74 days.

(21) Appl. No.: 13/845,405

(22) Filed: Mar. 18, 2013

(65) Prior Publication Data

US 2013/0258201 A1     Oct. 3, 2013

(30) Foreign Application Priority Data

Mar. 26, 2012   (TW) .............................. 101110402 A

(51) Int. Cl.

| H04L 27/06 | (2006.01) |
|---|---|
| H04N 9/67 | (2006.01) |
| H04H 40/90 | (2008.01) |
| H04L 27/26 | (2006.01) |
| H04N 7/20 | (2006.01) |

(52) U.S. Cl.
CPC ................. H04N 9/67 (2013.01); H04H 40/90 (2013.01); H04L 27/2657 (2013.01); H04L 27/2672 (2013.01); H04L 27/2688 (2013.01); H04L 27/2689 (2013.01); *H04N 7/20* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| 2011/0135042 A1* | 6/2011 | Tseng et al. ................... 375/344 |
| 2012/0121049 A1* | 5/2012 | Al-Banna ...................... 375/354 |

* cited by examiner

*Primary Examiner* — Adolf Dsouza
(74) *Attorney, Agent, or Firm* — Edell, Shapiro & Finnan, LLC

(57) ABSTRACT

A signal processing apparatus includes an initial detecting module, a mixer, a symbol rate detecting module, a judging module and a correcting module. The initial detecting module determines an initial carrier frequency offset of an input signal according to a spectrum of the input signal. The mixer adjusts the input signal according to the initial carrier frequency offset to generate a frequency-compensated signal. The symbol rate detecting module determines a symbol rate of the input signal. The judging module judges whether the initial carrier frequency offset is correct according to the frequency-compensated signal. When a judgment result of the judging module is negative, the correcting module determines a corrected carrier frequency offset according to the symbol rate and the spectrum.

11 Claims, 8 Drawing Sheets

SIGNAL PROCESSING APPARATUS AND ASSOCIATED METHOD

This application claims the benefit of Taiwan application Serial No. 101110402, filed Mar. 26, 2012, the subject matter of which is incorporated herein by reference.

BACKGROUND OF THE INVENTION

1. Field of the Invention

The invention relates in general to a digital television broadcasting technique, and more particularly, to a technique for determining a carrier frequency offset of a digital television signal.

2. Description of the Related Art

With advancements in communication techniques, digital television broadcasting gradually matures. Apart from being transmitted via cables, digital television signals can also be transmitted in a form of wireless signals via a base station or a satellite. The Digital Video Broadcasting—Satellite (DVB-S) and the Digital Video Broadcasting—Satellite—Second Generation (DVB-S2) are prevalent standards in digital television broadcasting.

In DVB-S and DVB-S2 specifications, symbol rates of digital television signals range between 0 to 45 MHz, while carrier frequencies of digital television signals range between 950 to 2150 MHz. As a result, the possible combinations of the two values above are rather formidable. Since a receiver cannot in advance be informed of a carrier channel and a symbol rate selected by the transmitter, it is critical that the receiver must be capable of accurately determining the two values in order to decode and restore a received signal.

In one conventional method for determining a carrier frequency offset, fast Fourier transform (FFT) is performed on an input signal, and a spectral line is generated by superimposing energy square values of all transform results, as shown in FIG. 1A. In the spectral line, a difference between a center C1 of a high-energy region and a center R (corresponding to one-half of computing points in the foregoing FFT) of the horizontal coordinate corresponds to a size of the carrier frequency offset.

As being interfered by in-channel noises or signals of neighboring channels during wireless transmission, not all signal spectrums appear as ideal as that shown in FIG. 1A. For example, an actual spectrum of an input signal may have two energy peaks as shown in FIG. 1B. A possible reason causing such spectrum is that the noise interference between the energy peaks is particularly severe. Another possible reason is that a neighboring channel is too close to a frequency band of desired target signal. If the occurrence of one of the energy peaks is contributed by the neighboring channel, a carrier frequency offset directly determined according to the spectrum inevitably contains an error. Yet, a current digital television broadcasting receiver system falls short in effectively determining which of the energy peaks truly represent(s) a desired target signal.

SUMMARY OF THE INVENTION

In view of the above issue, the invention is directed to a signal processing apparatus and associated method. The signal processing apparatus and associated method, by adopting a symbol rate having higher credibility, determines which of the energy peaks truly represent(s) a desired target signal and identifies a carrier frequency offset.

According to an embodiment the present invention, a signal process apparatus is provided. The signal processing apparatus includes an initial detecting module, a mixer, a symbol rate detecting module, a judging module and a correcting module. According to a spectrum of an input signal, the initial detecting module determines an initial carrier frequency offset of the input signal. The mixer adjusts the input signal according to the initial carrier frequency offset to generate a frequency-compensated signal. The symbol rate detecting module determines a symbol rate of the input signal. The judging module performs a phase recovery on the frequency-compensated signal, and judges whether the initial carrier frequency offset is correct as a judgement result according to whether the phase recovery renders a phase locking. The correcting module selectively determines a corrected carrier frequency offset according to the symbol rate and the frequency-compensated signal and providing the corrected carrier frequency offset to the mixed based on a judgment result of the judging module.

According to another embodiment of the present invention, a signal processing method is provided. The method includes steps of: determining an initial carrier frequency offset of an input signal according to a spectrum of the input signal; adjusting the input signal according to the initial carrier frequency offset signal to generate a frequency-compensated signal; determining a symbol rate of the input signal; performing a phase recovery on the frequency-compensated signal, and judging whether the initial carrier frequency offset is correct according to whether the phase recovery renders a phase locking; and selectively determining a corrected carrier frequency offset according to the symbol rate and the spectrum based on a judgment result of the judging step.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
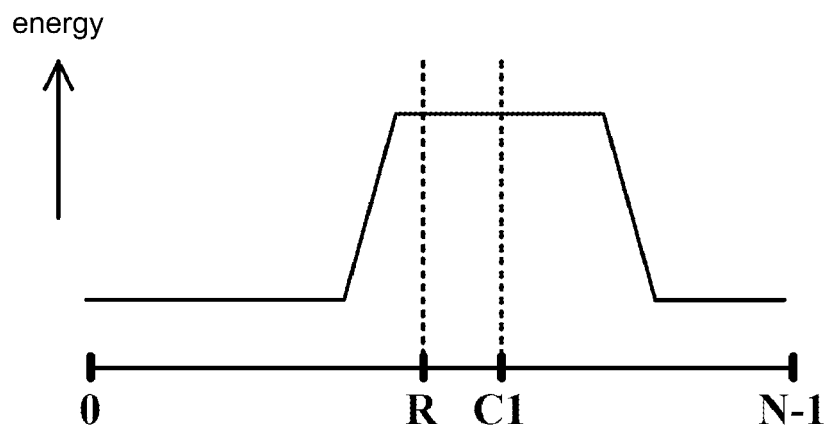
FIG. 1A and FIG. 1B are examples of signal spectrums generated by fast Fourier transform (FFT).
Figure 1B:
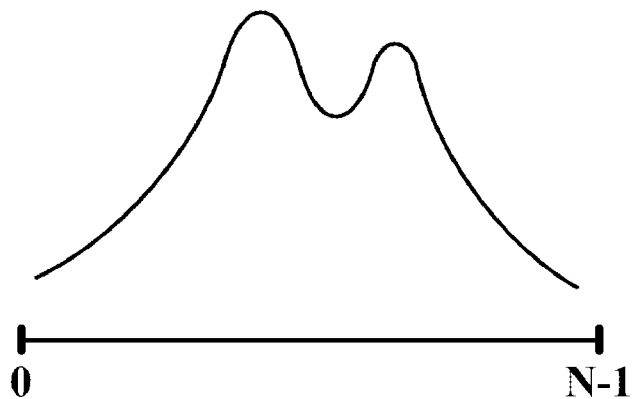
Figure 2:
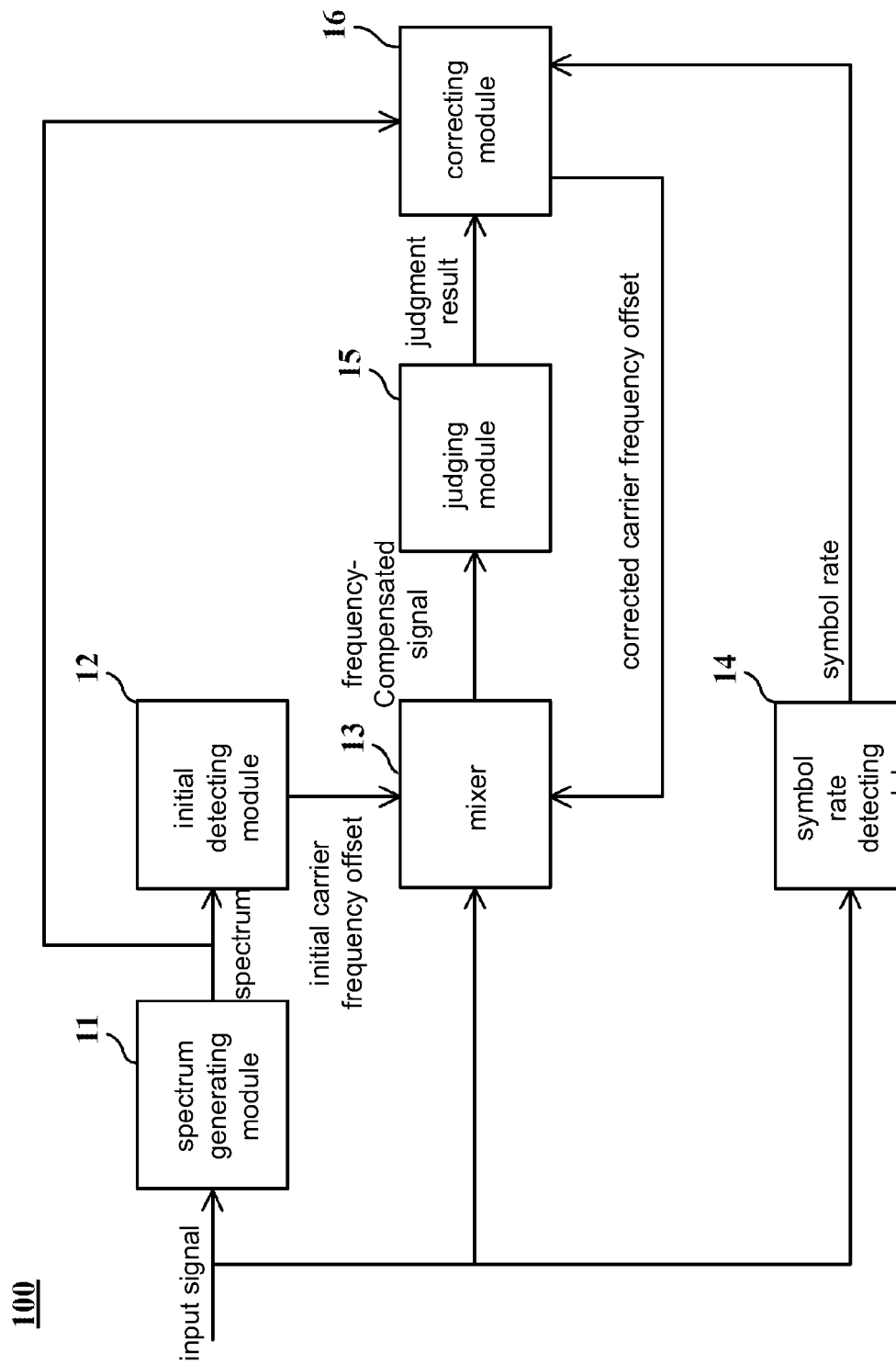
FIG. 2 is a block diagram of a signal processing apparatus according to an embodiment of the present invention.

FIG. 2 shows a signal processing apparatus 100 according to one embodiment of the present invention. The signal processing apparatus 100 includes a spectrum generating module 11, an initial detecting module 12, a mixer 13, a symbol rate detecting module 14, a judging module 15 and a correcting module 100. In practice, for example, the signal processing apparatus 100 may be integrated in a DVB-S or DVB-S2 compliant digital television signal receiver.

The spectrum generating module 11 receives and analyzes an input signal to generate a spectral line of the input signal. Assuming the signal processing apparatus 100 is located at a digital television signal receiver, the input signal may be a digital television signal of a particular channel. In practice, the spectrum generating unit 11 may divide a digital input signal into multiple segments (e.g., 32 segments or 64 segments), respectively perform fast Fourier transform (FFT) having same computing points, and superimpose energy square values of all transform results into a superimposed result. That is, the spectral line is in fact composed by many dots corresponding to different frequencies/energies. The spectrum generating unit 11 may further perform a smoothing procedure (e.g., through a moving average circuit) on the superimposed result to filter and remove noises in the spectral line to reduce possible misjudgments caused by the noises.

Figure 3:
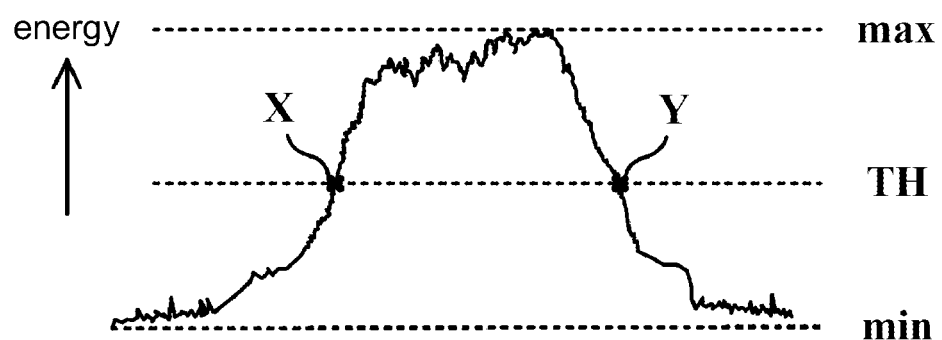
FIG. 3, FIG. 5, FIG. 6A and FIG. 6B are examples of related dots of spectrums according to embodiments of the present invention.

The initial detecting module 12 determines an initial carrier frequency offset according to the spectrum provided by the spectrum generating module 11. In this embodiment, the initial detecting module 12 first finds a maximum energy max and a minimum energy min in the spectral line, and accordingly determines a threshold TH, as shown in FIG. 3. For example, the threshold TH is an average of the maximum energy max and the minimum energy min. The initial detecting module 12 then determines an initial carrier frequency offset CFO according to two intersections X and Y formed by the spectrum and the threshold TH. For example, a difference between an average frequency of the two intersections X and Y and a central frequency (corresponding to one-half of the computing points of the foregoing FFT) as the initial carrier frequency offset CFO.

The mixer 13 adjusts the frequency of the input signal according to the initial carrier frequency offset CFO generated by the initial detecting module 12 to generate a frequency-compensated signal, such that the spectrum of the frequency-compensated signal is substantially symmetrical to a DC coordinate axis. Next, the judging module 15 judges whether the initial carrier frequency offset CFO is correct according to the frequency-compensated signal. In this embodiment, the judging module 15 performs a phase recovery on the frequency-compensated signal, and judges whether the initial carrier frequency offset CFO is correct according to whether the phase recovery generates a locked result. When the phase recovery generates a locked result, the initial carrier frequency offset CFO is judged as correct. Conversely, when the phase recovery fails a phase locking and cannot generate a locked result for a predetermined period of time, the initial carrier frequency offset CFO is judged as incorrect.

In practice, if one energy peak of two energy peaks in FIG. 3 is contributed by a neighboring channel, the carrier frequency offset determined by the initial detecting module 12 according to the spectrum is incorrect, such that the phase recovery performed by the judging module 15 fails the phase locking. For example, assume that the right energy peak in FIG. 3 is contributed by the neighboring channel and the left energy peak represents the real target signal. Thus, between the two intersections X and Y formed by the spectrum and the threshold TH determined by the spectrum, only the intersection X is correct while the intersection Y is incorrect. It is then obvious that an error exists in the carrier frequency offset obtained according to the frequency average of the intersections X and Y.

Figure 4:
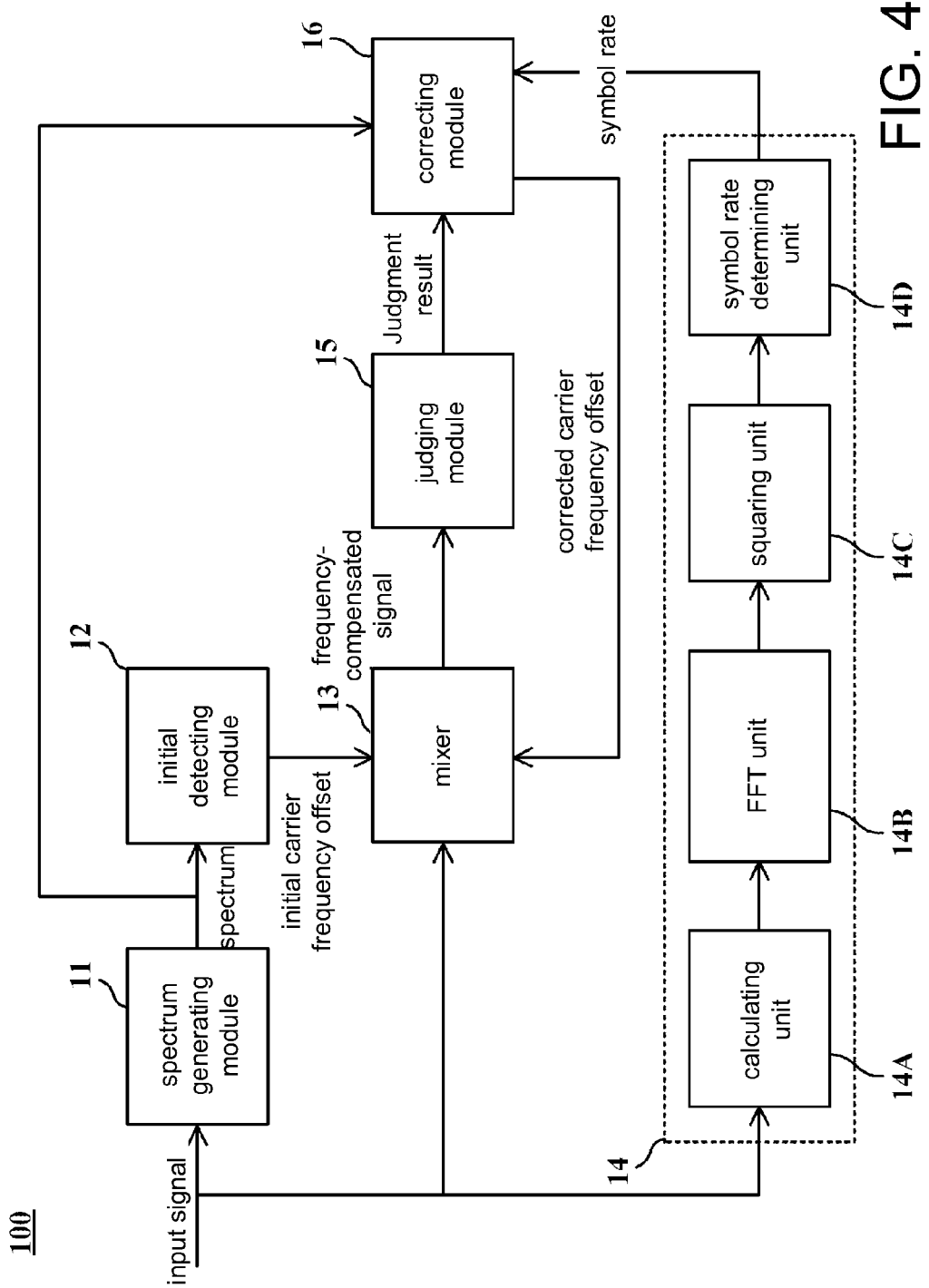
FIG. 4 is a detailed block diagram of the symbol rate detecting module 14 according to one embodiment.

As shown in FIG. 2, the input signal is also provided to the symbol rate detecting module 14 that determines a symbol rate of the input signal. FIG. 4 is a detailed block diagram of the symbol rate detecting module 14 according to one embodiment. The symbol rate detecting module 14 includes a power calculating unit 14A, an FFT unit 14B, a squaring unit 14C and a symbol rate determining unit 14D. In this embodiment, the power calculating unit 14A obtains a signal strength (in power) of the input signal by performing a calculation of $|r(n)|^2$ or $r(n)*conj[r(n-d)]$, where $r(n)$ represents a signal value of the input signal, n represents a time index, d represents a non-zero integer, and conj is a conjugate symbol. The FFT unit 14B performs FFT on a power calculation result generated by the power calculating unit 14A to generate a transform result, i.e., a power spectrum of the signal in the frequency domain. The squaring unit 14C squares an absolute value of the power spectrum to generate an accurate spectrum and obtain a peak value.

Figure 5:
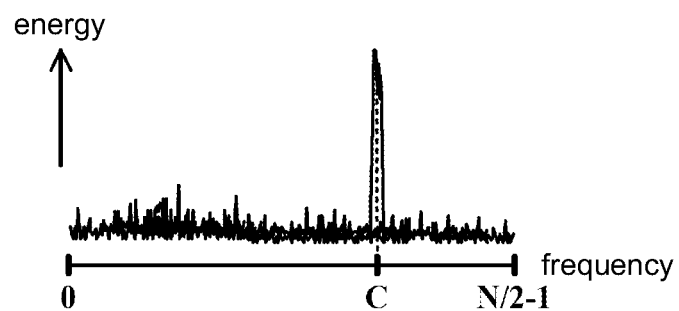

The square result generated by the squaring unit 14C may be depicted as an accurate spectrum in FIG. 5. The symbol rate determining unit 14D determines the symbol rate of the input signal according to a peak position in the accurate spectrum. Assuming that the number of computing points of FFT performed by the FFT unit 14B is N, a horizontal coordinate of the spectrum then ranges from 0 to (N/2−1). After determining the horizontal coordinate C corresponding to the peak value, the symbol rate determining unit 14D calculates the symbol rate SR according to an equation:

$$SR = \frac{C}{N} \times F,$$

where F represents a sampling frequency of the input signal when the input signal is received. It should be noted that, the procedure of generating the symbol rate by the symbol rate detecting module 14 may be simultaneously performed with operations of the initial detecting module 12, the mixer 13 and the judging module 15.

Referring to FIG. 2, the spectrum generated by the spectrum generating module 11, the judgment result generated by the judging module 15 and the symbol rate generated by the symbol rate detecting module 14 are all provided to the correcting module 16. When the judgment result of the judging module 15 is negative, the correcting module 16 determines a corrected carrier frequency offset CFO' according to the symbol rate SR and the spectrum.

Figure 6A:
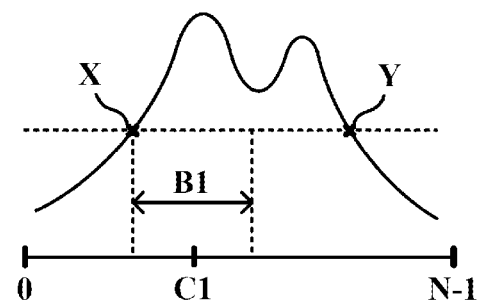

Referring to a spectrum in FIG. 6A for example, when the judgment result of the judging module 15 is negative, it implies that one energy peak of the two energy peaks in the spectrum is much likely contributed by another signal of a neighboring channel. Theoretically, when the threshold TH is the average of the maximum energy max and the minimum energy min of the same signal, the frequency difference between the two intersections X and Y is substantially equal to the symbol rate SR when the judgment result of the judging module 15 is affirmative. When the judgment result of the judging module 15 is negative, the correcting module 16 first utilizes the signal corresponding to the left energy peak as the real target signal, and, regarding the intersection X as a start point, selects a frequency segment B1 having a width corresponding to the symbol rate SR from the spectrum, as shown in FIG. 6A. After identifying a center C1 of the frequency segment B1, the correcting module 16 adopts a difference between a frequency corresponding to the center C1 and a reference frequency (corresponding to one-half of computing points in the foregoing FFT performed by the spectrum generating module 11) as the corrected carrier frequency offset CFO', and sends the corrected carrier frequency offset CFO' back to the mixer 13.

According to the corrected carrier frequency offset CFO', the mixer 13 generates another frequency-compensated signal, and provides the frequency-compensated signal to the judging module 15. The judging module 15 again performs the phase recovery on the new frequency-compensated signal, and judges whether the corrected carrier frequency offset CFO' is corrected according to whether the phase recovery generates a locked result. When a phase locked result is generated in the phase recovery, the corrected carrier frequency offset CFO' is judged as correct. Conversely, when the phase recovery fails a phase locking and cannot generate a locked result for a predetermined period of time, the corrected carrier frequency offset CFO' is judged as incorrect.

Figure 6B:
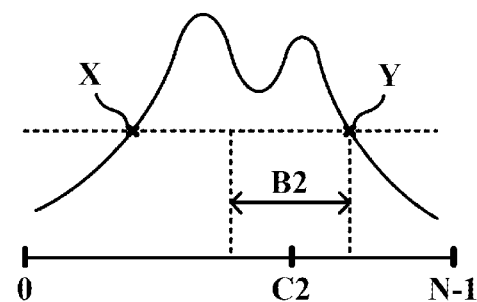

When the current judgment result of the judging module 15 is negative, the correcting module 16 then utilizes the signal corresponding to the right energy peak as the real target signal, and, regarding the intersection Y as a start point, selects a frequency segment B2 having a width corresponding to the symbol rate SR from the spectrum, as shown in FIG. 6B. After identifying a center C2 of the frequency segment B2, the correcting module 16 adopts a difference between a frequency corresponding to the center C2 and the reference frequency (corresponding to one-half of computing points in the foregoing FFT performed by the spectrum generating module 11) as the corrected carrier frequency offset CFO", and sends the corrected carrier frequency offset CFO" back to the mixer 13. Similarly, according to the corrected carrier frequency offset CFO", the judging module 15 again performs the phase recovery on the new frequency-compensated signal, and judges whether the corrected carrier frequency offset CFO" is corrected according to whether the phase recovery generates a locked result.

In other words, when the signal corresponding to the left energy peak in FIG. 6A or FIG. 6B truly represents the real target signal, the corrected carrier frequency offset CFO' should enable the judging module 15 to render an affirmative judgment result. Conversely, when the right energy peak in FIG. 6A or FIG. 6B truly represents the real target signal, only the corrected carrier frequency offset CFO'" enables the judging module 15 to render an affirmative judgment result. It should be noted that, the correcting module 16 does not necessarily choose the intersections X and Y as the start points of the frequency segments B1 and B2 to select the frequency segments having the width corresponding to the symbol rate SR.

In conclusion, by referring to the symbol rate having higher credibility, the signal processing apparatus 100 according to one embodiment of the present invention effectively determines which of the energy peaks truly represent(s) the desired target signal to identify the correct carrier frequency offset.

Figure 7:
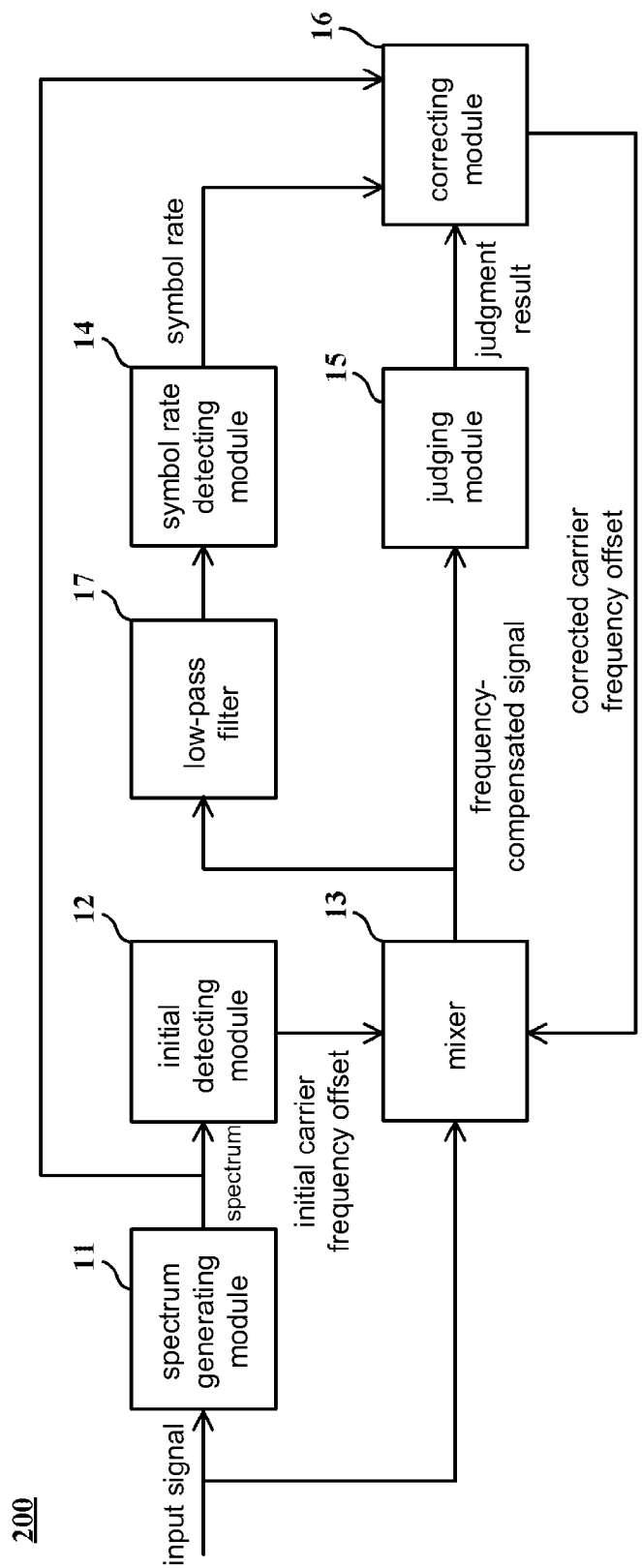
FIG. 7 and FIG. 8 are block diagrams of a signal processing apparatus according to embodiments of the present invention.

According to another embodiment of the present invention, a signal processing apparatus 200 shown in FIG. 7 is provided. A main difference between the signal processing apparatus 200 and the signal processing apparatus 100 is that, the symbol rate detecting module 14 in this embodiment determines the symbol rate SR according to the frequency-compensated signal generated by the mixer 13. In practice, regardless of whether the initial carrier frequency offset CFO generated by the initial detecting module 12 is correct, the symbol rate detecting module 14 can still obtain the correct symbol rate SR according to the foregoing method. Hence, the symbol rate detecting module 14 can determine the symbol rate SR according to the frequency-compensated signal generated at the first time. In other words, the symbol rate detecting module 14 is not required to recalculate the symbol rate SR even if another frequency-compensated signal is generated by the mixer 13.

Moreover, the frequency-compensated signal passes through a low-pass filter 17 before entering the symbol rate detecting module 14 in the signal processing apparatus 200. An advantage of such approach is that the low-pass filter 17 may first filter out interferences from other neighboring channels to further increase the accuracy of the symbol rate SR generated by the symbol rate detecting module 14.

Figure 8:
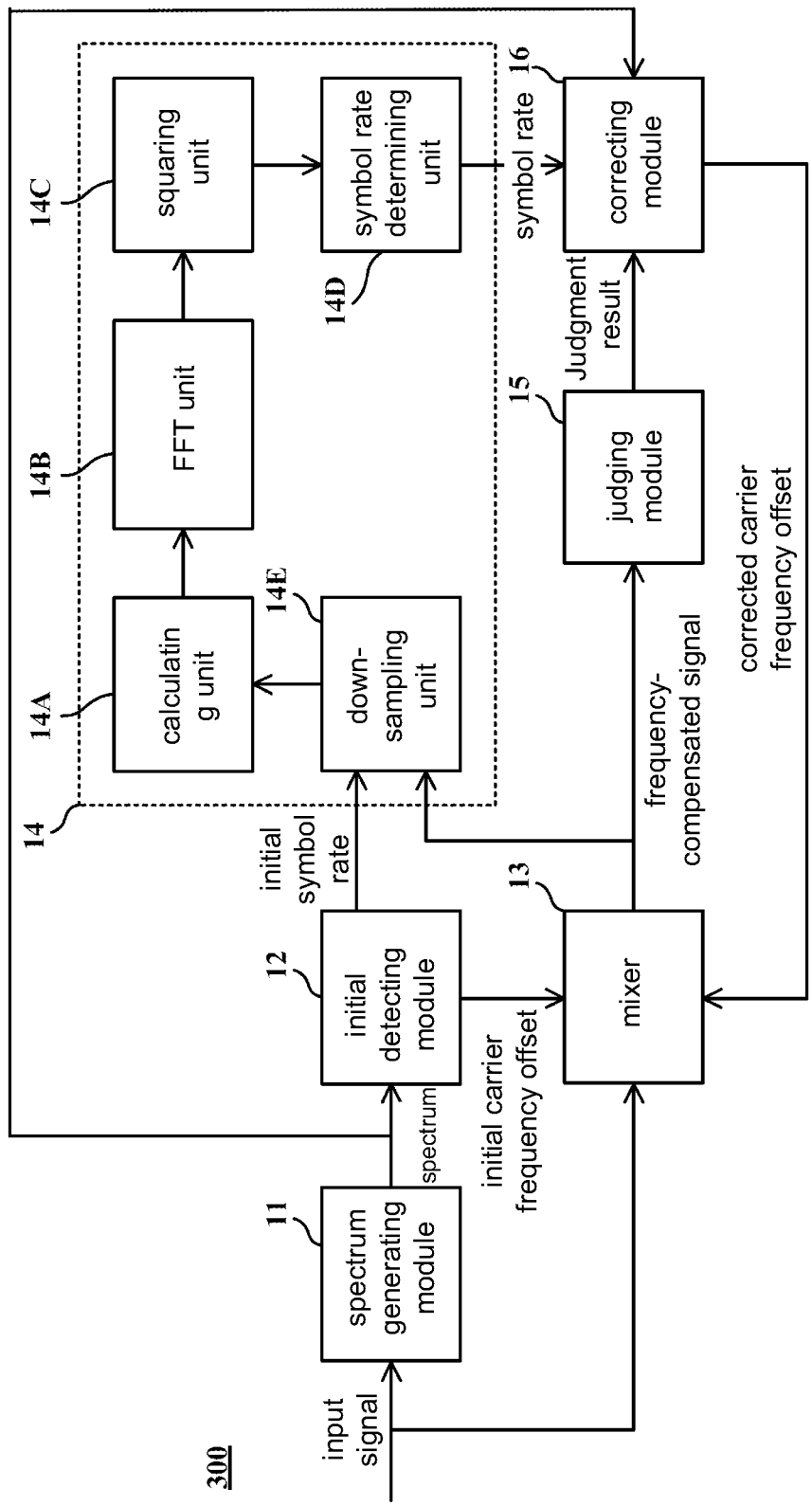

According to another embodiment of the present invention, a signal processing apparatus 300 shown in FIG. 8 is provided. A main difference between the signal processing apparatus 300 and the signal processing apparatus 200 is that, besides the initial carrier frequency offset CFO, the initial detecting module 12 in this embodiment further determines an initial symbol rate SR0 according to the spectrum generated by the spectrum generating module 11, and provides the initial symbol rate SR0 to the symbol rate detecting module 14. As shown in FIG. 8, compared to the symbol rate detecting module 14 in FIG. 2, the symbol rate detecting module 14 in the embodiment shown in FIG. 8 further includes a down-sampling unit 14E.

Assume that the input signal is sampled according to an original sampling frequency F0 while entering the signal processing apparatus 300. As previously stated, the symbol rate of digital television signals range between 0 to 45 MHz. For example, the original sampling frequency F0 of the digital television signal may be 96 MHz, which is slightly higher than twice of the maximum symbol rate. The down-sampling unit 14E determines a down-sampling ratio d according to the original sampling frequency F0 and the initial symbol rate SR0 generated by the initial detecting module 12, and down-samples the frequency-compensated signal according to the down-sampling ratio d to generate a down-sampled signal. For example, the down-sampling unit 14E determines the down-sampling ratio d according to the equation:

$$d = \frac{F0}{SR0 \times m},$$

where m represents a sampling magnification preferably being between 2 and 4, e.g., 2.5. That is to say, a lower limit of the reduced sampling frequency is approximately twice of the symbol rate SR. Under reasonable sampling conditions, a smallest possible sampling magnification m is preferred. According to the above principles, the down-sampling module 14E determines the down-sampling ratio d, and accordingly down-samples the frequency-compensated signal. In practice, for example, the down-sampling 14E may be implemented by a four-stage anti-aliasing filter. Referring to FIG. 8, the calculating unit 14A in this embodiment generates a calculation result according to the down-sampled signal. Operation details of the circuit blocks 14A to 14D may be referred from above associated descriptions.

One of the reasons for implementing the down-sampling is that, since a variation range of the symbol rate is rather large (e.g., the symbol rate may range between 0 and 45 MHz in the DVB-S and DVB-S2 standards), a large number of computing points are also needed by the operation unit performing the FFT to obtain an accurate symbol rate. However, the large number of computing points equals high costs. Therefore, an optional approach is to employ down-sampling, so that an appropriate and acceptable FFT unit is allowed to perform operations on signals of all symbol rates.

Figure 9:
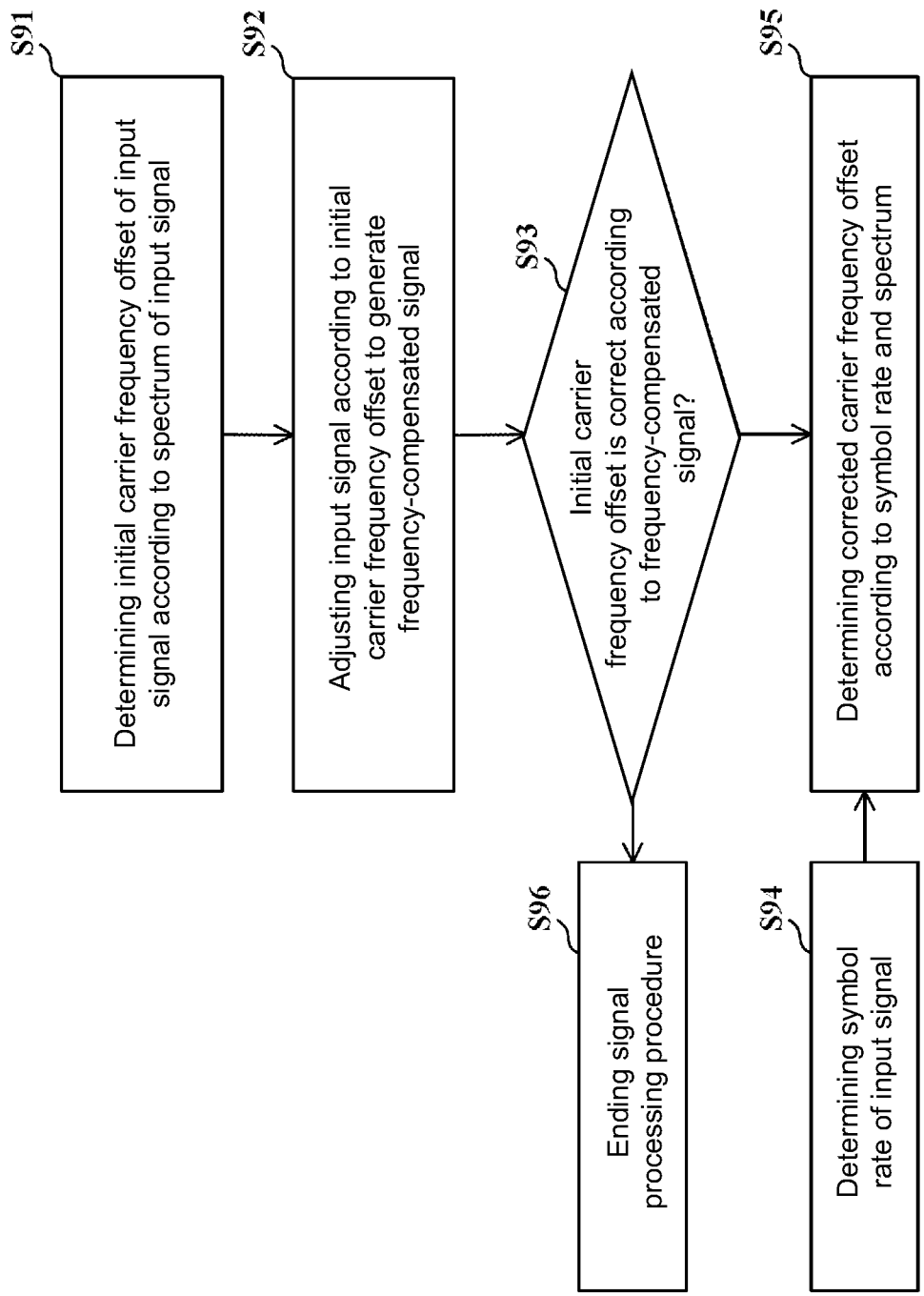
FIG. 9 is a flowchart of a signal processing method according to an embodiment of the present invention.

According to yet another embodiment of the present invention, a signal processing method is provided, as shown by a flowchart in FIG. 9. In Step S91, an initial carrier frequency offset of an input signal is determined according to a spectrum of the input signal. In Step S92, the input signal is adjusted according to the initial carrier frequency offset to generate a frequency-compensated signal. In Step S93, it is judged whether the initial carrier frequency offset is correct according to the frequency-compensated signal. In Step S94, a symbol rate of the input signal is determined. When a judgment result of Step S93 is negative, Step S95 is performed to determine a corrected carrier frequency offset according to the symbol rate and the spectrum. When the judgment result of Step S93 is affirmative, the process for signal processing ends in Step S96. In practice, when the symbol rate is generated according to the input signal itself, Step S94 may be simultaneously performed with Steps 91 and 92. On the other hand, when the symbol rate is generated according to the frequency-compensated signal, Step S94 is performed temporally after Step S92.

It should be noted that, variations in circuit operations given in descriptions associated with the signal processing apparatuses 100 to 300 may be applied to the method for detecting a symbol rate in FIG. 9, and details thereof shall be omitted herein.

Therefore, the signal processing apparatus and signal processing method disclosed by the above embodiments of the present invention, by referring to the symbol rate having higher credibility, are capable of effectively determining which of the energy peaks in the spectrum truly represent(s) the desired target signal to identify the correct carrier frequency offset.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing apparatus, comprising:
    an initial detecting module, for determining an initial carrier frequency offset of an input signal according to a spectrum of the input signal;
    a mixer, for adjusting the input signal according to the initial carrier frequency offset to generate a frequency-compensated signal;
    a symbol rate detecting module, for determining a symbol rate of the input signal;
    a judging module, for performing a phase recovery on the frequency-compensated signal, and judges whether the initial carrier frequency offset is correct as a judgement result according to whether the phase recovery renders a phase locking; and
    a correcting module, coupled to the mixer, for selectively determining a corrected carrier frequency offset according to the symbol rate and the spectrum and providing the corrected carrier frequency offset to the mixer based on the judgment result,
    wherein when the judgment result of the judging module is negative, the correcting module selects a frequency segment having a width corresponding to the symbol rate from the spectrum, and renders the corrected carrier frequency offset with a difference between a center frequency of the frequency segment and a reference frequency.

2. The apparatus according to claim 1, wherein the initial detecting module finds a maximum energy and a minimum energy in the spectrum and accordingly determines a threshold, and renders the initial carrier frequency offset with a difference between a frequency average, corresponding to two intersections of the spectrum and the threshold, and a reference frequency; and the correcting module selects the frequency segment within the two intersections.

3. The apparatus according to claim 1, wherein the mixer further readjusts the input signal according to the corrected carrier frequency offset to generate another frequency-compensated signal; the judging module further judges whether the corrected carrier frequency offset is correct according to the another frequency-compensated signal, and the correcting module further determines another corrected carrier frequency offset according to the symbol rate and the spectrum when the corrected carrier frequency offset is deemed incorrect.

4. The apparatus according to claim 1, wherein the symbol rate detecting module comprises:
    a power calculating unit, for generating a power calculation result according to the input signal or the frequency-compensated signal; wherein the power calculation result is $|r(n)|^2$ or $r(n)*conj[r(n-d)]$, where $r(n)$ represents a signal value of the input signal, $n$ represents a time index, $d$ represents a non-zero integer, and conj is a conjugate symbol;
    a fast Fourier transform (FFT) unit, for performing FFT on the power calculation result to generate a power spectrum;
    a squaring unit, for squaring an absolute value of the power spectrum to generate a square result; and
    a symbol rate determining unit, for determining the symbol rate according to a peak position of an accurate spectrum corresponding to the square result.

5. The apparatus according to claim 1, wherein the initial detecting module further determines an initial symbol rate of the input signal according to the spectrum, and provides the initial symbol rate to symbol rate detecting module; the input signal is sampled at an original sampling frequency; and the symbol rate detecting unit comprises:
    a down-sampling unit, for determining a down-sampling ratio according to the initial symbol rate and the original sampling frequency, and down-sampling the frequency-compensated signal according to the down-sampling ratio to generate a down-sampled signal;
    a power calculating unit, for generating a power calculation result according to the down-sampled signal; wherein the power calculation result is $|r(n)|^2$ or $r(n)*conj[r(n-d)]$, where $r(n)$ represents a signal value of the input signal, $n$ represents a time index, $d$ represents a non-zero integer, and conj is a conjugate symbol;
    an FFT unit, for performing FFT on the power calculation result to generate a power spectrum;
    a squaring unit, for squaring an absolute value of the power spectrum to generate a square result; and
    a symbol rate determining unit, for determining the symbol rate according to a peak position of an accurate spectrum corresponding to the square result.

6. A signal processing method, performed by a signal processing apparatus, comprising:
    a) determining an initial carrier frequency offset of an input signal according to a spectrum of the input signal;
    b) adjusting the input signal according to initial carrier frequency offset to generate a frequency-compensated signal;
    c) determining a symbol rate of the input signal;
    d) performing a phase recovery on the frequency-compensated signal;
    e) judging whether the initial carrier frequency offset is correct as a judgment result according to whether the phase recovery renders a phase locking; and
    f) selectively determining a corrected carrier frequency offset according to the symbol rate and the spectrum to the mixer based on the judgment result, wherein step (f) comprises:
when the judgment result is negative, selecting a frequency segment having a width corresponding to the symbol rate from the spectrum, and rendering the corrected carrier frequency offset with a difference between a center frequency of the frequency segment and a reference.

7. The method according to claim 6, wherein step (a) comprises:
finding a maximum energy and a minimum energy in the spectrum;
determining a threshold according the maximum energy and the minimum energy; and
rendering the initial carrier frequency offset with a difference between a frequency average, corresponding to two intersections of the spectrum and the threshold, and a reference frequency; and
step (f) comprises:
selecting the frequency segment within the two intersections regarding one of the two intersections as a start point.

8. The method according to claim 6, further comprising:
judging whether the corrected carrier frequency offset is correct;
when the corrected carrier frequency offset is deemed incorrect, determining another corrected carrier frequency offset according to the symbol rate and the spectrum.

9. The method according to claim 6, wherein step (c) comprises:
generating a power calculation result according to the input signal or the frequency-compensated signal; wherein the power calculation result is $|r(n)|^2$ or $r(n)*conj[r(n-d)]$, where $r(n)$ represents a signal value of the input signal, n represents a time index, d represents a non-zero integer, and conj is a conjugate symbol;
performing FFT on the power calculation result to generate a power spectrum;
squaring an absolute value of the power spectrum to generate a square result; and
determining the symbol rate according to a peak position of an accurate spectrum corresponding to the square result.

10. The method according to claim 6, wherein the input signal is sampled at an original sampling frequency; step (a) further comprises determining an initial symbol rate of the input signal according to the spectrum; and step (c) comprises:
determining a down-sampling ratio according to the initial symbol rate and the original sampling frequency, and down-sampling the frequency-compensated signal according to the down-sampling ratio to generate a down-sampled signal;
generating a power calculation result according to the down-sampled signal; wherein the power calculation result is $|r(n)|^2$ or $r(n)*conj[r(n-d)]$, where $r(n)$ represents a signal value of the input signal, n represents a time index, d represents a non-zero integer, and conj is a conjugate symbol;
performing FFT on the power calculation result to generate a power spectrum;
squaring an absolute value of the power spectrum to generate a square result; and
determining the symbol rate according to a peak position of an accurate spectrum corresponding to the square result.

11. A signal processing apparatus, comprising:
an initial detecting module, for determining an initial carrier frequency offset of an input signal according to a spectrum of the input signal;
a mixer, for adjusting the input signal according to the initial carrier frequency offset to generate a frequency-compensated signal;
a symbol rate detecting module, for determining a symbol rate of the input signal;
a judging module, for performing a phase recovery on the frequency-compensated signal, and judges whether the initial carrier frequency offset is correct as a judgement result according to whether the phase recovery renders a phase locking; and
a correcting module, coupled to the mixer, for selectively determining a corrected carrier frequency offset according to the symbol rate and the spectrum and providing the corrected carrier frequency offset to the mixer based on the judgment result,
wherein the initial detecting module further determines an initial symbol rate of the input signal according to the spectrum, and provides the initial symbol rate to symbol rate detecting module; the input signal is sampled at an original sampling frequency; and the symbol rate detecting unit comprises:
a down-sampling unit, for determining a down-sampling ratio according to the initial symbol rate and the original sampling frequency, and down-sampling the frequency-compensated signal according to the down-sampling ratio to generate a down-sampled signal;
a power calculating unit, for generating a power calculation result according to the down-sampled signal; wherein the power calculation result is $|r(n)|^2$ or $r(n)*conj[r(n-d)]$, where $r(n)$ represents a signal value of the input signal, n represents a time index, d represents a non-zero integer, and conj is a conjugate symbol;
an FFT unit, for performing FFT on the power calculation result to generate a power spectrum;
a squaring unit, for squaring an absolute value of the power spectrum to generate a square result; and
a symbol rate determining unit, for determining the symbol rate according to a peak position of an accurate spectrum corresponding to the square result.

* * * * *